(12) United States Patent
Hagenauer

(10) Patent No.: US 9,151,645 B2
(45) Date of Patent: Oct. 6, 2015

(54) METHOD FOR TESTING THE PLAUSABILITY OF OUTPUT SIGNALS OF A RESOLVER

(75) Inventor: Andreas Hagenauer, Friedburg (DE)

(73) Assignee: KUKA Roboter GmbH, Augsburg (DE)

( * ) Notice: Subject to any disclaimer, the term of this patent is extended or adjusted under 35 U.S.C. 154(b) by 151 days.

(21) Appl. No.: 14/131,818

(22) PCT Filed: Jul. 11, 2012

(86) PCT No.: PCT/EP2012/063525
§ 371 (c)(1),
(2), (4) Date: Jan. 9, 2014

(87) PCT Pub. No.: WO2013/007734
PCT Pub. Date: Jan. 17, 2013

(65) Prior Publication Data
US 2014/0148948 A1    May 29, 2014

(30) Foreign Application Priority Data

Jul. 14, 2011    (DE) .......................... 10 2011 079 116

(51) Int. Cl.
*G05B 19/19* (2006.01)
*G01D 18/00* (2006.01)
*G01D 5/20* (2006.01)

(52) U.S. Cl.
CPC .................. *G01D 18/00* (2013.01); *G01D 5/20* (2013.01); *G01D 5/2073* (2013.01); *G01D 5/2086* (2013.01)

(58) Field of Classification Search
CPC .. G05B 23/0235; G06F 11/008; B23K 11/10; B23K 11/253; B23K 11/311; B23K 11/315; G01D 5/24457; G01D 5/24461; G01B 7/003

USPC ............... 318/568.11, 568.16, 568.17, 568.2, 318/568.21, 400.38, 400.39, 400.4, 661, 318/577, 640, 568.24; 700/245, 254, 258, 700/260, 252
See application file for complete search history.

(56) References Cited

U.S. PATENT DOCUMENTS

| | | | | |
|---|---|---|---|---|
| 3,727,119 A | * | 4/1973 | Stanley et al. | ........... 318/568.25 |
| 3,934,186 A | * | 1/1976 | Hayakawa et al. | ........... 318/567 |
| 4,967,127 A | * | 10/1990 | Ishiguro et al. | ............... 318/571 |
| 7,159,440 B2 | * | 1/2007 | Kostenick et al. | ............. 73/1.15 |
| 7,174,796 B2 | * | 2/2007 | Kostenick et al. | ....... 73/862.541 |
| 7,209,862 B2 | * | 4/2007 | Taniguchi et al. | ............ 702/183 |

(Continued)

FOREIGN PATENT DOCUMENTS

| | | |
|---|---|---|
| DE | 102006007871 A1 | 9/2006 |
| DE | 102007029190 A1 | 3/2008 |

(Continued)

OTHER PUBLICATIONS

German Patent Office; Search Report in German Patent Application No. 10 2011 079 116.7 dated Feb. 27, 2015; 8 pages.

(Continued)

*Primary Examiner* — Rita Leykin
(74) *Attorney, Agent, or Firm* — Wood, Herron & Evans, LLP

(57) ABSTRACT

The invention relates to a method for testing the plausibility of output signals ($u_1$, $u_2$) of a resolver (21), by means of which an angular position of two elements (3-7) of a machine (R) can be determined in relation to each other.

8 Claims, 3 Drawing Sheets

(56) References Cited

U.S. PATENT DOCUMENTS

| | | | |
|---|---|---|---|
| 7,292,910 B2 * | 11/2007 | Gmeiner | 700/245 |
| 7,853,358 B2 * | 12/2010 | Joly | 700/260 |
| 8,024,071 B2 * | 9/2011 | Komatsu et al. | 700/258 |

FOREIGN PATENT DOCUMENTS

| | | | |
|---|---|---|---|
| DE | 2007057376 A1 * | 5/2009 | |
| DE | 102007057376 A1 | 5/2009 | |
| DE | 102009046923 A1 | 5/2011 | |
| DE | 102011075238 A1 | 11/2012 | |
| EP | 2211148 A2 | 7/2010 | |

OTHER PUBLICATIONS

European Patent Office; Search Report in International Patent Application No. PCT/EP2012/063525 dated Feb. 3, 2013; 10 pages.

European Patent Office; Preliminary Report on Patentability in International Patent Application No. PCT/EP2012/063525 dated Jan. 14, 2014; 7 pages.

* cited by examiner

METHOD FOR TESTING THE PLAUSABILITY OF OUTPUT SIGNALS OF A RESOLVER

TECHNICAL FIELD

The present invention relates to a method for testing the plausibility of output signals of a resolver.

BACKGROUND

So called resolvers are used in order to determine the angular position of two links of a machine which can be rotated in relation to one another with respect to an axis of rotation. One example of a machine with a link that can be rotated in relation to itself is a robot. Robots in general are handling machines which are equipped for the automatic handling of objects with useful tools and are programmable in several axes of movement in particular with regard to orientation, position and work routine. Robots usually have a robotic arm with several links and programmable controllers (control devices) which control or regulate the movement sequences of the robotic arm during operation. The drives are e.g. electrical drives and the links are pivoted in relation to one another with respect to axes of rotation.

Resolvers are known to a person skilled in the art, e.g. from EP 2 211 148 A2. A resolver is defined as an electro-magnetic transmitter for conversion of the angular position of two components moved in relation to one another to electrical output signals. Two components moved in relation to one another are for example two links pivoted with respect to an axis of rotation or a rotor of a motor that rotates relative to the stator of the motor. The output signals are as a rule two sinusoidal electrical signals shifted by 90 degree phases, in particular two sinusoidal electrical voltages shifted by 90 degree phases, on the basis of which the angular position modulo n can be determined, wherein n is the so-called number of pole pairs of the resolver which arises from the arrangement of coil windings and is a small positive natural number, and can also be 1.

SUMMARY

The invention addresses the problem of specifying an improved method for testing the plausibility of the output signal of a resolver. In particular, on the basis of the measured values of the resolver with a number of pole pairs n>1 (this applies at least to the conventional resolvers in robotics) this plausibility check permits the drawing of conclusions about the actual motor angle and not only modulo n, as corresponds to the current state of the art.

This problem is solved by a method for testing the plausibility of the output signals of a resolver, by means of which an angular position of two links of a machine pivoted with respect to an axis of rotation can be determined in relation to one another, exhibiting the following steps:

prior to the appropriate operation of the machine, determination of parameters of the employed resolvers that allow a calculation of a valid range of expected output signals of the resolvers depending on the motor position during the appropriate operation of the machine and by means of the resolver, generation of two output signals, by means of which the angular position of the two links in relation to one another can be determined, comparison of at least one of the output signals with a target value of the output signal in question assigned to the resolver or comparison of a combination of the two output signals with a target value of the combination of the two output signals and only using the output signals for the determination of the angular position of the two links in relation to one another, when the output signal in question differs from its target value less than a predefined value or when the combination of the two output signals differs by less than a predefined value.

Another aspect of the invention relates to a machine with at least two links that can be moved in relation to one another with respect to an axis of rotation, a drive with a motor for moving the links in relation to one another, a resolver coupled to the motor, said resolver being provided to determine an angular position of the rotor of the motor relative to its stator, and a controller connected to the drive and the resolver which is equipped to determine the angular position of the two links in relation to one another according to the inventive method. The inventive machine is in particular an industrial robot with a robotic arm with several links and drives for moving the links as well as a controller connected to the drives, said controller being equipped to control the drives for a movement of the links in relation to one another.

The use of resolvers for determining the angular position of two links in relation to one another is known in principle to a person skilled in the art. A resolver is defined as an electromagnetic transmitter for conversion of the angular position of two components moved in relation to one another to electrical output signals. Two components moved in relation to one another are for example two links pivoted with respect to an axis of rotation or a rotor of a motor that rotates relative to the stator of the motor.

The two links can for example be moved in relation to one another by means of a motor of the machine, so that the output signals of the resolver are assigned to the angular position of the rotor of the motor relative to its stator. Preferably the at least one output signal of the resolver or the combination of the two output signals are compared via at least one entire motor revolution of the motor with the corresponding target value. In the event of a motor revolution the shaft or the rotor of the motor rotates by 360 degrees relative to the stator of the motor.

Resolvers comprise e.g. two windings offset by 90 degrees and a further winding that can be rotated with respect to an axis of rotation. In the operation of the resolver its further development is supplied with an electrical AC voltage, as a result of which an electrical AC voltage is induced in each of the stationary windings, said windings being phase shifted to one another by 90 degrees. Since, as a rule some of these windings are mounted rotationally shifted n times (in the case of this multiplicity one speaks of the pole pair number n as in the case of servomotors), the resulting output signals repeat in the case of ideal production periodically in 1/n of the motor revolution, so that an ideally produced resolver of the pole pair number n theoretically can only serve as an absolute value transmitter for 1/n motor revolutions.

In the case of ideal or ideally assumed resolvers their output signals are shifted out of phase exactly by 90 degrees and produce sinusoidal output signals of equal amplitude with period 1/n motor revolution. If the output signals are normalized, in the case of the correctly working ideal resolvers the sum of the squares of the output signals is always 1.0.

Real components, that is, also real resolvers, however differ in practice from ideal components or from components assumed as ideal. Output signals of real resolvers are e.g. not shifted by exactly 90 degrees, so that the sum of the squares of the output signals is simply not always 1.0. Likewise, as a rule, the n times arrangement of the pole pairs is not exactly symmetrical. As a result, also the output signals of resolvers of the pole pair number n (without consideration of additional interference) are not periodic in 1/n motor revolutions, but rather actually periodic in 1 motor revolution. The signals are almost periodic in 1/n motor revolution, so that the actual periodicity would be ignored as interference in 1 motor revolution, which more likely would lead to problems than would be productively analyzed.

If the expected output signals of the resolver are known, then in accordance with the invention at least one of the output signals will be compared with a target value of the output signal in question assigned to the resolver. Thus, in particular absolute values of the two output signals can be utilized at extreme positions in order, in the case of specified positions of the resolver to clearly infer the angular position, in particular the angular position of the motor.

If the output signal in question differs from its target value by no more than the predefined value, then the output signals are used for the angular calculation, otherwise they are discarded. Hence, this constitutes a plausibility test or a plausibility check of the output signals of the resolver.

The predefined value is e.g. a maximum expected noise, with which the output signals are filled.

As an alternative, the combination of the two output signals will be used and compared with the target value of the combination of the two output signals. One example of a combination of the output signals is the sum of the squares of the output signals.

According to one preferred embodiment of the inventive method the output signals are normalized. Then the combination of the output signals is the sum of the squares of the normalized output signals and the target value f of the combination of the two output signals meets the following requirement $f=1+a\cdot\sin(x+b)$ where the parameter a is a constant with a positive value and the parameter b is a constant value that arises on the basis of the production tolerance of the resolver and the target value f is applied via the angular position of the rotor of the motor.

The parameters a and b can be determined for example by means of parameter identification through evaluation of the following requirement $u_1^2+u_2^2=1+a\cdot\sin(x+b)$ where the output signals of the resolver are $u_1$ and $u_2$ and x expresses the motor angle, thus in the event of a motor revolution running from 0 to 2. In particular, for the purpose of parameter identification the rotor of the motor is rotated by at least one entire revolution.

According to one variant of the inventive method, said method exhibits the following steps:
  generation of discrete output signals of the resolver, in particular by cyclical scanning of the output signals,
  determination of the target value for all theoretically possible discrete angular positions of the motor during at least one entire motor revolution
  comparing the sum of the normalized squares of the discrete output signals with the corresponding target values, and
  using only those discrete output signals for determining the angular position of the rotor relative to the stator of the motor for the discrete output signals for which the sum of the squares of the normalized output signals in question differs from the target value by a maximum of the predefined value.

Preferably, use is made of the fact that there is a range for angular positions of the resolver in which an assignment to an angular position is unambiguous or that at least two hypotheses about a complete motor revolution cannot both be plausible.

In order to obtain a pre-selection of plausible output signals of the resolver, according to one variant of the inventive method only those normalized output signals can be used that lie in the range of $[1-a-r, 1+a+r]$.

In order to make operation of the inventive machine possible even when the output signals of the resolver are not plausible, according to one embodiment of the inventive method the current angular positions of the two links in relation to one another are estimated, as long as the sum of the squares of the normalized output signals in question differs from the target value by more than the predefined value.

In order to detect rotation of the resolver during an interruption of an electrical supply voltage, according to one embodiment of the inventive method the following steps can be carried out:
  saving the determined angular positions,
  once the electrical supply voltage necessary for determining the angular position is available again after an outage, comparing the angular position determined directly after the supply voltage is again available to the angular position saved directly before the failure of the supply voltage,
  on the basis of the comparison, determining whether the resolver was rotated during the failure of the supply voltage.

BRIEF DESCRIPTION OF THE DRAWINGS

An exemplary embodiment of the invention is presented as an example in the attached schematic drawings. The figures show the following.

DETAILED DESCRIPTION

Figure 1:
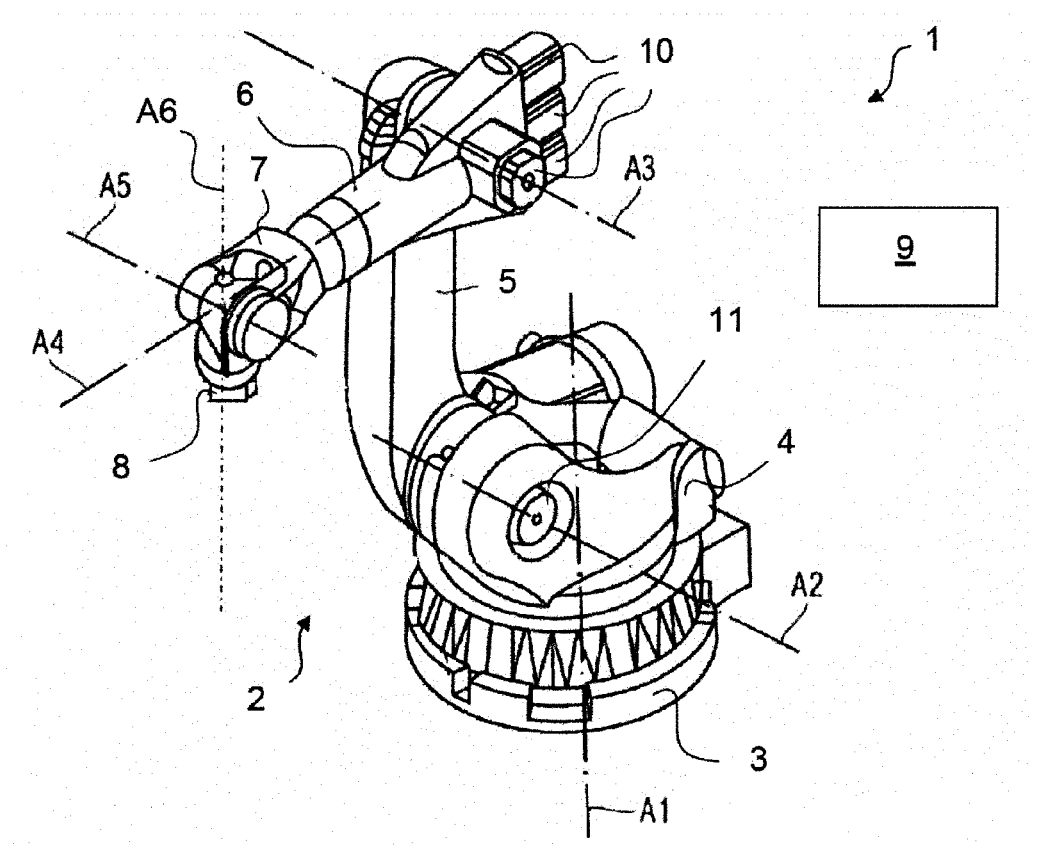
FIG. 1 shows a robot with a robotic arm and a control device.

FIG. 1 shows in perspective view a robot 1 with a robotic arm 2. In the case of the present exemplary embodiment, the robotic arm 2 comprises several links arranged in sequence and connected by means of joints. The links are in particular one stationary or movable frame 3 and a carousel 4 pivoting around an axis A1 running vertically relative to the frame 3. In the case of the present exemplary embodiment, additional links of the robotic arm 2 are a lever 5, an extension arm 6 and a preferably multi-axis robotic hand 7 with a fastening device designed as a flange 8 for the fastening of an end effector not shown in greater detail. The lever 5 is for example pivoted on an arm bearing head not described in greater detail on the carousel 4 around a preferably horizontal axis A2. On the upper end of the lever 5 the extension arm 6 is pivoted around a likewise preferably horizontal axis A3. Said extension arm bears on its end the robotic hand 7 with its preferably three axes A4, A5, A6.

In order to move the robot 1 or its robotic arm 2, said robot comprises in generally known manner drives connected to a control device, said drives being in particular electrical drives. In FIG. 1, only some of the electric motors 10, 11 of these drives are shown. A computing program runs on the control device 9, by means of which the control device 9 controls the robot 1 during its operation for example such that the flange 8 or a so-called tool center point executes a predetermined movement. If necessary the control device 9 controls the drives, as is known in principle to a person skilled in the art.

Figure 2:
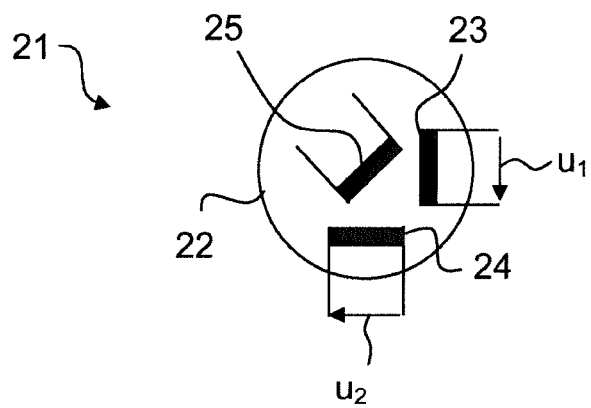
FIG. 2 shows a resolver with 1 pole pair.

In order to determine the angular positions of the individual links of the robotic arm 2 in relation to one another, the robotic arm 2 comprises resolvers 21 shown in FIG. 2, said resolvers being arranged in a manner known in principle to a person skilled in the art on the motors 10, 11 moving the individual links. Resolvers are sometimes also referred to as angular position transducers.

A resolver is defined as an electro-magnetic transmitter for conversion of the angular position of two components moved in relation to one another to electrical output signals. Two components moved in relation to one another are for example two links pivoted with respect to an axis of rotation or a rotor of a motor that rotates relative to the stator of the motor.

In the case of the present exemplary embodiment of a resolver with pole pair number 1, the resolvers 21 each exhibit a housing 22 designed in particular in the shape of a cylinder, in which two windings offset by 90 degrees (first winding 23, second winding 24) are in fixed arrangement relative to the housing 21. The resolvers 21 further each exhibit a 3 pole pair additional winding 25 that can be rotated with respect to an axis of rotation. For example, if the motor 10 is equipped with a resolver 21, then the additional winding 25 rotates with the rotor or the shaft of the motor 10 in relation to its stator.

In the operation of the resolver 21 its additional winding 25 is supplied with electrical alternating current voltage, as a result of which an electrical alternating current voltage is induced in each of the stationary windings 23, 24 which are phase shifted to one another by 90 degrees. The two alternating current voltages are the output signals $u_1$, $u_2$ of the two stationary windings 23, 24, wherein the output signal of the first winding 23 has reference number $u_1$ and the output signal of the second winding 24 has reference number u2. The resolvers 21 are connected to the control device 9, so that the output signals $u_1$, $u_2$ of the resolvers 21 of the control device 9 are available for an evaluation.

Figure 3:
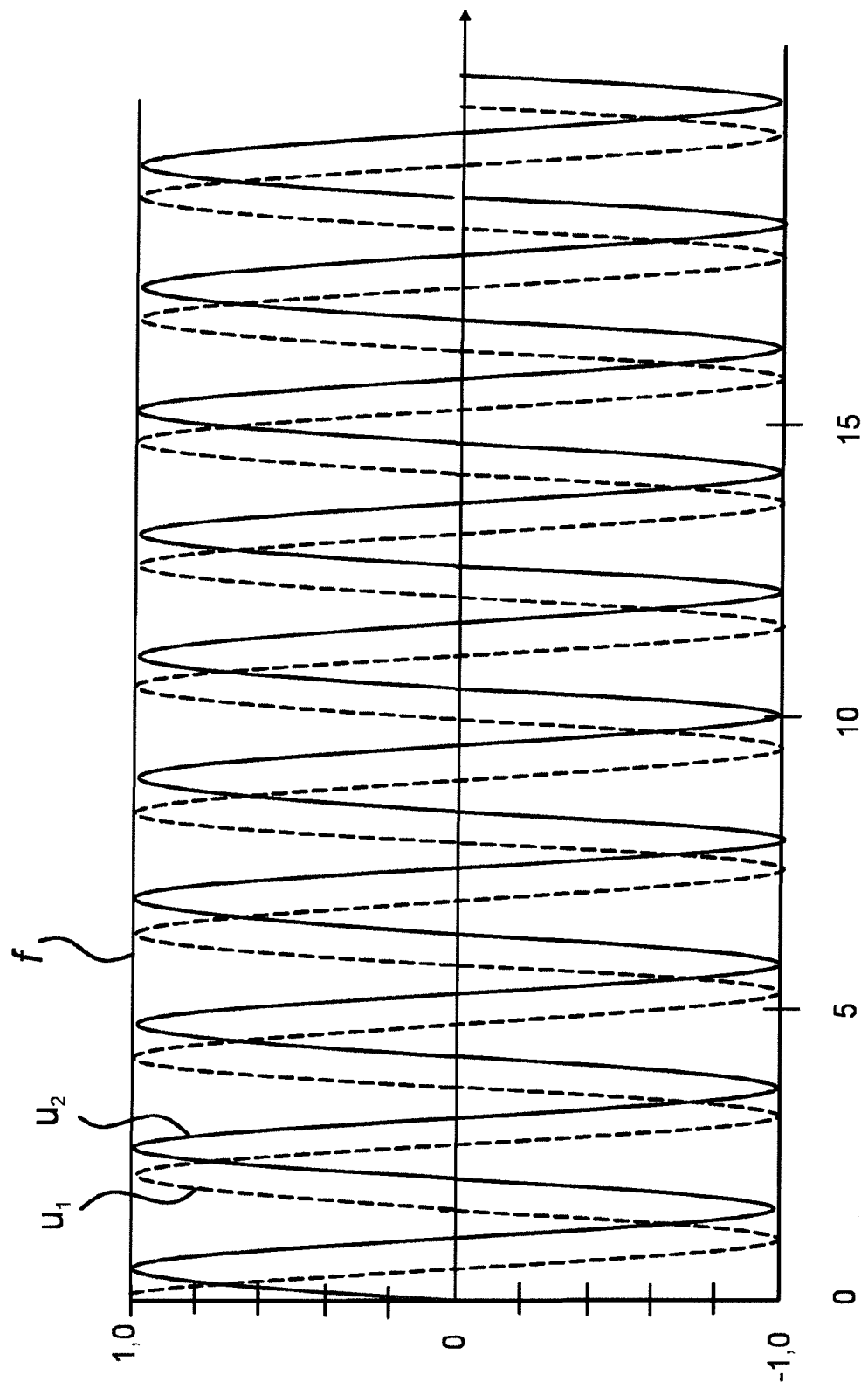
FIG. 3 shows output signals of an ideal resolver with 3 pole pairs.

If we assume that the resolver 21 is an ideal component, then its stationary windings 23, 24 are arranged offset by exactly 90 degrees and generate output signals $u_1$, $u_2$ of equal amplitude. This is depicted in FIG. 3, wherein the first signal $u_1$ follows a cosine and the second signal $u_2$ follows a sine. The output signals $u_1$, $u_2$ are in the process applied via the position of the shaft or of the rotor of the motor 10, 11 in question (mathematical notation: one revolution of the shaft is equivalent to $2 \cdot \pi$). If the output signals $u_1$, $u_2$ are normalized, then their amplitudes equal 1.0 and for example the following results for the output signals $u_1$, $u_2$:

$$u_1 = \cos(x)$$

$$u_2 = \sin(x)$$

By means of the output signals $u_1$, $u_2$ the control device 9 can then calculate the angular position of the rotor of the motor 10, 11 in question to its stator.

For normalized output signals $u_1$, $u_2$ moreover the sum of their squares are always equal to 1.0, thus the following holds true:

$$f_{ideal} = u_1^2 + u_2^2 = 1.0$$

where $f_{ideal}$ is a plausibility signal, on the basis of whose evaluation a conclusion can be drawn as to whether the measured output signals $u_1$, $u_2$ can be correct, i.e. by analyzing whether the sum of the squares of the two normalized output signals $u_1$, $u_2$ equals 1.0 or is approximately equal to 1.0.

Figure 4:
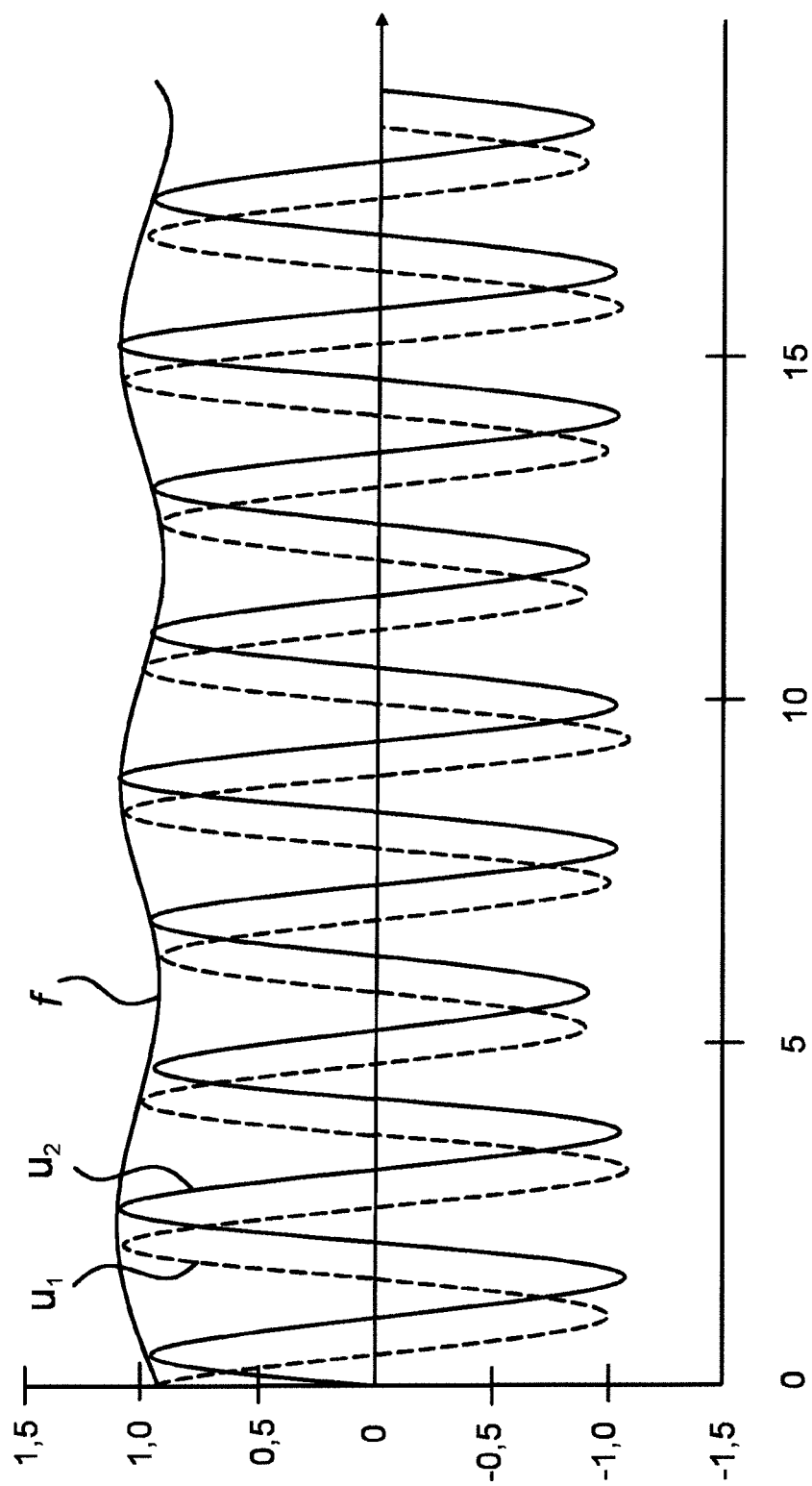
FIG. 4 shows output signals of a real resolver with 3 pole pairs.

Real components, thus also real resolvers 21 however, differ in practice from ideal components or from components assumed to be ideal. FIG. 4 shows at least approximately the progressions of the output signals $u_1$, $u_2$ and of the values of the plausibility signal f for a real resolver with pole pair number 3 (modification to 21, here for simplicity's sake the (less interesting) pole pair number 1 was used) which was not produced completely rotationally symmetrical with period 3. As a result, for the expected plausibility signal f at least roughly the following arises:

$$f = u_1^2 + u_2^2 = 1 + a \cdot \sin(x + b)$$

where the parameter a is a constant with a positive value less than zero and the parameter b is a constant value which, due to the production tolerances of the resolver 21 occurs essentially randomly and b in particular lies in the range of $0.2 \cdot \pi$ and x represents the motor angle.

In the case of the present exemplary embodiment the parameters a, b were determined in advance for each of the used resolvers 21 and saved in the control device 9. These parameters were determined for example, within the scope of a parameter identification, with an equalization calculation, for example by recording the respective plausibility signals f with at least one, preferably several revolutions of the shaft of the motor 10, 11 in question and subsequently analyzing them. In the case of the present exemplary embodiment this leads to the control device 9 to be automated by means of a suitable computing program.

In addition, a limit, in particular a noise limit r, which is preferably less than the parameter a, can be determined, which represents the normal expected maximum signal noise of the resolver 21 in question. In particular, in the event of the use of statistical methods the noise limit r can also be greater than or equal to the parameter a, so that the method described in principle remains applicable.

In the case of the present exemplary embodiment a computing program runs on the control device 9 which processes the output signals $u_1$, $u_2$. In order to achieve this, the output signals $u_1$, $u_2$ are first scanned e.g. by means of an A/D converter and if necessary filtered by means of analog and/or digital filters. In particular, the output signals $u_1$, $u_2$ are cyclically scanned with a sufficiently high frequency. The scanned output signals $u_1$, $u_2$ are subsequently further processed by means of the computing program.

If the noise limit r is used, then the computing program running on the control device 9 can be executed such that it first carries out a first plausibility check of the output signals $u_1$, $u_2$ or a combination of the two and e.g. only uses those values of the scanned output signals $u_1$, $u_2$ for a determination of the angular position of the rotor of the motor 10, 11 in question to its stator in relation to one another for which the value $f = u_1^2 + u_2^2$ lies in the range $[1-a-r, 1+a+r]$ for the determined values of the normalized output signals $u_1$, $u_2$.

If the determined value lies outside of the range $[1-a-r, 1+a+r]$, then these scanned output signals $u_1$, $u_2$ are discarded, thus not used for determining the angular position of the rotor of the motor 10, 11 in question to its stator. This constitutes in particular a first plausibility check of the output signals $u_1$, $u_2$ of the resolver 21 in question. For those normalized output signals $u_1$, $u_2$ of the resolver 21 in question which lie within the range $[1-a-r, 1+a+r]$ the control device 9 subsequently determines the resolver angle assigned to the resolver 21, $\phi_{res}$, i.e. the corresponding angular position of the rotor in relation to the stator of the motor 10, 11 in question modulo the pole pair number n. This occurs e.g. by means of the following equation:

$$\phi_{res} = \text{Arctan } 2(u_2, u_1)$$

In the case of the present exemplary embodiment, the control device 9 is in particular designed such that it carries out a second plausibility check by determining the expected value of the plausibility signal f, that is the function 1+a·sin(x+b) for all these potential $\phi_{mot}$ that arise from the modulo function, for all theoretically possible discrete angular positions of the motor 10, 11 in question during a complete motor revolution $$\left( \{\phi_{mot,1}, \phi_{mot,2}, \ldots, \phi_{mot,n}\} = \left\{ \frac{\phi_{res}}{n}, \frac{\phi_{res}}{n} + \frac{2\pi}{n}, \ldots, \frac{\phi_{res}}{n} + \frac{2\pi(n-1)}{n} \right\} \right)$$

that correspond to the determined value of the plausibility signal f. All angular positions of the motor 10, 11 in question in which the sum of the squares of the normalized output signals $u_1$, $u_2$ differs from the expected value of the plausibility signal f=(1+a·sin(x+b)) by more than r, will be classified as implausible (where here x is to be used for the respective $T_{mot}$ from $\{\phi_{mot,1}, \phi_{mot,2}, \ldots, \phi_{mot,n}\}$).

If in the case of the present exemplary embodiment all theoretical angular positions $\phi_{mot}$ are also considered implausible, the entire determination of the angular positions will be considered a measuring error.

From the form of the plausibility signal f it follows that in part of the positions of the resolver 21 only one angular position of the motor 10, 11 in question is considered plausible. Typically, these are contiguous regions which differ by the position of the resolver 21 that belongs to the angular position of the motor 10, 11 in question at which the expected plausibility signal f takes on its maximum or its minimum.

In such a case an angular position of the motor 10, 11 can be rated as clearly measured.

Angular positions of the motor 10, 11 in question that do not pass the second plausibility check will in particular be considered clearly ruled out.

Thus in the normal case a proper subset of the possible angular positions of the motor 10, 11 in question will pass the second plausibility check unambiguity will ordinarily only exist in certain positional ranges of the resolver 21.

In the case of the present exemplary embodiment the control device 9 can also be arranged such that as long as there are no signal losses, the information additionally obtained (plausibility of all conceivable motor positions to a resolver position) will only be used for verification. Then the current motor position should always be in the set of plausible positions. If this is not the case, if necessary in consideration of debouncing, the current signal, that is, the currently determined output signals $u_1$, $u_2$ will not be used and the angular position of the resolver 21 will be estimated. If necessary, it can still be distinguished whether there is no plausible motor angle at all, or only the expected motor angle that arises from the last measured motor angle in the case of known rotating speed and known scanning time is not plausible.

It is possible that the control device 9 is arranged such that the determination of the angular position in the event of invalid output signals $u_1$, $u_2$ will be estimated until the output signals $u_1$, $u_2$ satisfy the second plausibility check.

In order to obtain a sufficiently good estimate of the angular position, for example the value of the angular position is estimated for a maximum half motor revolution.

If the time of the signal loss was sufficiently short, but longer than the time in which a half resolver revolution would have been conceivable, an incorrectly estimated motor position would be detected no later than after one motor revolution, since only the correct position permanently passes the second plausibility check in the event of a complete motor revolution. If necessary, this state can also be made available to the application, since after a "blind flight" in this time period the current position cannot be verified as certain, but rather cannot yet be considered falsified, however after one further motor revolution can be verified without fail.

In the case of the present exemplary embodiment the control device 9 can also be designed such that an angular position measured by means of the resolver 21 can be saved in order to compare the saved determined angular position after a restart of the motor 10, 11 in question after a power outage to an angular position determined again by means of the resolver 21 after starting the motor 10, 11 in question. As a result, after a disconnection and restart of the motor 10, 11 in question, it is possible to determine whether the motor 10, 11 in question was not moved while the control device 9 of the resolver 21 was disconnected.

In the case of the present exemplary embodiment the method does not check for the equality of the two determined angular positions, but rather an undesired rotation of the resolver 21 is only inferred when the two determined angular positions differ by a predefined amount. The present method makes it possible to increase this amount by the factor n without increasing the probability of unknown rotations. In particular, this property makes it possible to preferably use other components in the motors, in particular brakes, which otherwise are excluded, because they lead to rotations that are so strong already in the normal case that the probability of unknown rotations would be too high, since the predefined amount must exceed the normal case, in order not to rate the normal case as an error.

In the case of the present exemplary embodiment provision can also be made that if the relation of noise limit r and the parameter a is so unfavorable that there is not an angular position of the resolver 21 with certainty in which only one angular position of the motor 10, 11 in question is plausible. In this case, it is possible to carry out assignment of measured angular positions of the resolver 21 to angular positions of the motor 10, 11 in question with statistical means on the basis of several succeeding measurements. During an entire motor revolution the n motor positions are evaluated that arise by an offset by 2Π/n. The actual position will pass the plausibility check with the significantly highest frequency. One can also consider as an extension the actual distance of the measured plausibility signal ($u_1^2 + u_2^2$), that is, accept the motor position after an entire motor revolution as a real motor position whose plausibility function has the lowest L2 distance to the measured plausibility signal.

By conscious selection of "poor resolvers" or the conscious production of resolvers with imbalance (e.g. electrically asymmetrical winding of specified coils) provision can be made that the noise limit r is relatively low vis-à-vis the parameter a. The described method is not necessarily the only one with which the imbalance of the signals can be utilized. For example, as an alternative only the absolute values of sine signal and cosine signal can be utilized at extreme positions in order in the case of specified resolver positions to be able to clearly infer the motor position.

What is claimed is:

1. A method for testing the plausibility of the output signals of a resolver with pole pair number n, by which an angular position of two links of a machine pivoted with respect to an axis of rotation can be determined, wherein the two links are moved in relation to one another by a motor of the machine, the method comprising:
generating two discrete output signals with the resolver during the normal operation of the machine, by which the angular position of the two links in relation to one another can be determined, wherein the two output signals of the resolver are assigned to the angular position of a rotor of the motor in relation to a stator of the motor, and the two output signals are evaluated for at least one complete motor revolution;

comparing the sum of the normalized squares of the discrete output signals with a corresponding target value, which is determined for all theoretically possible discrete angular positions of the motor during an entire motor revolution; and using only those discrete output signals for determining the angular position of the rotor in relation to the stator of the motor for those discrete output signals, for which the sum of the squares of the normalized output signals in question differs from the target value no more than by a predefined value;

wherein the output signals are normalized, and the combination of the output signals, the sum of the squares of the normalized output signals, and the target value of the combination of the two output signals meet the following requirement:

$$f = 1 + a \cdot \sin(x+b)$$

wherein:
x is a the angular position of the rotor of the motor relative to the stator,
a is a constant with a positive value,
b is a constant value that arises on the basis of the production tolerance of the resolver, and
f is the target value.

2. The method of claim 1, wherein parameters a and b are determined by parameter identification in accordance with the following requirement:

$$u_1^2 + u_2^2 = 1 + a \cdot \sin(x+b)$$

wherein:
$u_1$, $u_2$ are the discreet output signals.

3. The method of claim 1, wherein the predefined value is a maximum noise to be expected with which the output signals, or a combination of the two output signals, are filled.

4. The method of claim 1, wherein the two discrete output signals are generated by cyclical scanning.

5. The method of claim 1, further comprising:
using only those normalized output signals that lie in the range [1−a−r, 1+a+r], wherein r is the predefined value.

6. The method of claim 1, further comprising:
estimating the current angular position of the two links in relation to one another, as long as the sum of the squares of the normalized output signals differs from the target value by more than the predefined value.

7. The method of claim 1, further comprising:
saving the determined angular positions;
after an electrical supply voltage necessary for determining the angular position is available again after an outage, comparing the angular position determined directly after the supply voltage is once again available to the angular position saved directly before the outage of the supply voltage; and
on the basis of the comparison, determining whether the resolver was rotated during the outage of the supply voltage.

8. An industrial robot, comprising:
at least two links that can be moved in relation to one another with respect to an axis of rotation;
a drive including a motor for moving the links in relation to one another;
a resolver coupled to the motor and which is provided for determining an angular position of a rotor of the motor in relation to a stator of the motor; and
a control device operatively coupled with the drive and the resolver;
the control device being equipped to determine the angular position of the two links in relation to one another in accordance with the method of claim 1.

* * * * *